US011644294B2

(12) United States Patent
Adriano et al.

(10) Patent No.: US 11,644,294 B2
(45) Date of Patent: May 9, 2023

(54) AUTOMATIC GENERATION OF PROBE PATH FOR SURFACE INSPECTION AND PART ALIGNMENT

(71) Applicant: Autodesk, Inc., San Francisco, CA (US)

(72) Inventors: Marco Adriano, Sutton Coldfield (GB); Lee Sanders, Tamworth (GB); Richard Matthew Stubley, Hayley Green (GB)

(73) Assignee: Autodesk, Inc., San Francisco, CA (US)

( * ) Notice: Subject to any disclaimer, the term of this patent is extended or adjusted under 35 U.S.C. 154(b) by 190 days.

(21) Appl. No.: 17/162,787

(22) Filed: Jan. 29, 2021

(65) Prior Publication Data

US 2022/0244029 A1    Aug. 4, 2022

(51) Int. Cl.
*G01B 5/008* (2006.01)
*G01B 5/20* (2006.01)
*G05B 19/418* (2006.01)

(52) U.S. Cl.
CPC ............. *G01B 5/008* (2013.01); *G01B 5/20* (2013.01); *G05B 19/41885* (2013.01); *G05B 2219/49007* (2013.01)

(58) Field of Classification Search
CPC ...................................................... G01B 5/008
USPC ............................................................ 702/168
See application file for complete search history.

(56) References Cited

U.S. PATENT DOCUMENTS

| 5,898,590 | A | 4/1999 | Wampler |
| 6,014,816 | A | 1/2000 | Matsumiya et al. |
| 6,301,796 | B1 | 10/2001 | Cresson |
| 6,850,331 | B1 | 2/2005 | Ferber et al. |
| 9,869,538 | B2 | 1/2018 | Dolgikh |

(Continued)

FOREIGN PATENT DOCUMENTS

| DE | 102005037837 | 2/2007 |
| GB | 2350429 | 11/2000 |

(Continued)

OTHER PUBLICATIONS

Extended European Search Report in European Appln. No. 22153757.4, dated Jun. 20, 2022, 7 pages.

(Continued)

*Primary Examiner* — Ricky Go
(74) *Attorney, Agent, or Firm* — Fish & Richardson P.C.

(57) ABSTRACT

Methods, systems, and apparatus, including medium-encoded computer program products, for automatic generation of probe path for surface inspection and part alignment. A mesh model is obtained of at least a portion of a three dimensional model of a part to be manufactured using a computer-controlled manufacturing system. Vertex points from the mesh model are collected to be an initial set of probing points in a three dimensional space of a working coordinate system of the computer-controlled manufacturing system, and filtering out points are filtered out from the initial set of probing points based on coverage of the least a portion of the three dimensional model to produce a final set (Continued)

of probing points. The final set of probing points is provided for use in alignment or surface inspection of the part by the computer-controlled manufacturing system.

20 Claims, 6 Drawing Sheets

(56) References Cited

U.S. PATENT DOCUMENTS

| | | | |
|---|---|---|---|
| 10,190,861 B2 | 1/2019 | Dolgikh | |
| 10,724,840 B2 * | 7/2020 | Noda | G01B 5/008 |
| 2006/0007449 A1 | 1/2006 | Christoph | |
| 2008/0189969 A1 | 8/2008 | Fuchs et al. | |
| 2010/0268355 A1 * | 10/2010 | Chang | G01B 21/04 |
| | | | 702/150 |
| 2014/0053423 A1 | 2/2014 | Brenner | |
| 2014/0211191 A1 | 7/2014 | Jensen | |
| 2015/0000148 A1 | 1/2015 | Abe | |
| 2016/0084633 A1 | 3/2016 | Ferrari | |
| 2016/0102960 A1 | 4/2016 | Dolgikh | |
| 2016/0169656 A1 | 6/2016 | Padovani et al. | |
| 2016/0178362 A1 | 6/2016 | Iseli et al. | |
| 2018/0180395 A1 | 6/2018 | Dolgikh | |
| 2019/0043255 A1 * | 2/2019 | Somasundaram | G06T 17/20 |
| 2019/0258225 A1 * | 8/2019 | Link | G05B 19/4097 |
| 2021/0200907 A1 * | 7/2021 | Cariou | G06F 30/10 |

FOREIGN PATENT DOCUMENTS

| | | |
|---|---|---|
| WO | WO2003095943 | 11/2003 |
| WO | WO2007141509 | 12/2007 |
| WO | WO2008074989 | 6/2008 |
| WO | WO2009024783 | 2/2009 |
| WO | WO2010049693 | 5/2010 |
| WO | WO2012037059 | 3/2012 |
| WO | WO2013050729 | 4/2013 |

OTHER PUBLICATIONS

Barker Brettel LLP, Response to Examination Report Under Section 18(3) in Application No. GB1517837.9 filed May 29, 2018, 12 pages.

Examination Report under Section 18(3) in Application No. GB 15117837.9, dated Mar. 28, 2018, 4 pages.

Search Report in Application No. GB 1417771.1, dated Feb. 12, 2015, 6 pages.

Search Report in Application No. GB 1517837.9, dated Mar. 15, 2016, 6 pages.

* cited by examiner

AUTOMATIC GENERATION OF PROBE PATH FOR SURFACE INSPECTION AND PART ALIGNMENT

BACKGROUND

This specification relates to manufacturing of physical structures using additive and/or subtractive manufacturing systems and techniques.

Computer-aided design software and computer-aided manufacturing software has been developed and used to generate three-dimensional (3D) representations of parts and to manufacture the physical structures of those parts, e.g., using Computer Numerical Control (CNC) manufacturing techniques. Further, additive manufacturing, also known as solid free form fabrication or 3D printing, refers to any manufacturing process where 3D parts are built up from raw material (generally powders, liquids, suspensions, or molten solids) in a series of two-dimensional tiers or cross-sections. An example of additive manufacturing is Fused Filament Fabrication (FFF). A 3D extrusion printer typically uses FFF to lay down material, such as a plastic filament or metal wire, which is unwound from a coil, in tiers to produce a 3D printed part.

In addition, subtractive manufacturing refers to any manufacturing process where 3D parts are created from stock material (generally a "blank" or "workpiece" that is larger than the 3D part) by cutting away portions of the stock material. Such manufacturing processes typically involve the use of multiple CNC machine cutting tools in a series of operations, starting with a roughing operation, an optional semi-finishing operation, and a finishing operation. During roughing operation(s), large portions of the workpiece are cut away quickly (relative to semi-finishing and finishing operations) using cutting tool(s) of the CNC machining system in order to approximate the final shape of the part being manufactured. Moreover, hybrid manufacturing systems have been developed, where additive and subtractive manufacturing are combined, such as a CNC machine that combines laser metal deposition with high-precision 5-axes adaptive milling.

SUMMARY

This specification describes technologies relating to determining an optimal set of probe points for performing surface inspection and/or part alignment of a three-dimensional (3D) part in subtractive and/or additive manufacturing systems. The optimal set of probe points can be filtered from an initial set of probe points generated for the 3D part, where the optimal set of probe points can include a minimum number of points required to meet a threshold of accuracy in the part alignment while minimizing an amount of time to perform the measurements at each of the probe points.

In general, one or more aspects of the subject matter described in this specification can be embodied in one or more methods that include: obtaining a mesh model of at least a portion of a three dimensional model of a part to be manufactured using a computer-controlled manufacturing system. Vertex points are collected from the mesh model to be an initial set of probing points in a three dimensional space of a working coordinate system of the computer-controlled manufacturing system, and points are filtered out from the initial set of probing points based on coverage of the least a portion of the three dimensional model of the part to produce a final set of probing points in the three dimensional space of the working coordinate system of the computer-controlled manufacturing system. The final set of probing points is provided for use in alignment or surface inspection of the part by the computer-controlled manufacturing system.

The foregoing and other implementations can each optionally include one or more of the features described herein, alone or in combination. In particular, one implementation includes all the following features in combination. In some implementations, obtaining the mesh model includes converting the at least a portion of the three dimensional model of the part into the mesh model using a minimum length for edges between the vertex points defined in accordance with a size of a probe tool to be used in the alignment or surface inspection of the part by the computer-controlled manufacturing system. The collecting of vertex points can include excluding, from the initial set of probing points, any point in the three dimensional space that is not reachable by the probe tool due to a geometry of the probe tool and one or more available orientations of the probe tool within a working envelop for the part when fixtured in the computer-controlled manufacturing system.

In some implementations, the alignment or surface inspection of the part includes part alignment, including finding a vector for each vertex point in the initial set of probing points, the vector for the vertex being normal to a surface of the part at the vertex point, and assigning the vertex points to respective axes of manufacturing available in the working coordinate system of the computer-controlled manufacturing system in accordance with a degree of alignment between the vector for each vertex point and each one of the respective axes of manufacturing. The filtering of probe points can include ensuring a minimum number of points in each of the respective axes of manufacturing remain in the final set of probing points to lock degrees of freedom for the part alignment.

In some implementations, the assigning including ranking the vertex points in the respective axes of manufacturing, and filtering includes removing lower ranked points assigned to respective ones of the axes of manufacturing while maintaining coverage of the least a portion of the three dimensional model of the part. The minimum number of points can be ensured in each of the respective axes of manufacturing remain by not removing any higher ranked points forming a minimum set of points previously identified as required to lock the degrees of freedom.

In some implementations, the methods include producing a set of voxels over the initial set of probing points, where a resolution of the set of voxels is determined in accordance with a specified level of point density, and the filtering includes removing points located within the voxels of the set of voxels until each voxel contains only one point or only points included in the minimum set of points previously identified as required to lock the degrees of freedom.

In some implementations, the methods include receiving user input specifying (i) one or more surfaces, solid bodies or both to indicate the at least a portion of the three dimensional model of the part, (ii) the probe tool to be used, (iii) the degrees of freedom to be constrained, (iv) the specified level of point density, (v) alignment, surface inspection or both are to be performed, or (vi) a combination of two or more thereof.

In some implementations, the methods include identifying the minimum set of points required to lock the degrees of freedom, including: selecting points from the initial set of probing points based on each point's vector alignment with at least one axis of manufacturing to ensure good alignment for each of a first three of the axes of manufacturing. At least a fourth axis of manufacturing is selected when the selected points are not sufficient to lock the degrees of freedom, and the additional points that are reachable by the probe tool using the at least a fourth axis of manufacturing can be added to the initial set of probing points. Points from the additional points are selected based on each point's vector alignment with at least one axis of manufacturing to ensure good alignment for each of the first three of the axes of manufacturing and complete the minimum set of points required to lock the degrees of freedom.

In some implementations, providing the final set of probe points includes directing the computer-controlled manufacturing system to perform the alignment or surface inspection of the part using the final set of probing points.

Likewise, one or more aspects of the subject matter described in this specification can be embodied in one or more systems that include a data processing apparatus including at least one hardware processor and a non-transitory computer-readable medium encoding instructions of a computer-aided design or manufacturing program.

Thus, as will be appreciated, the non-transitory, computer-readable medium can encode instructions configured to cause the data processing apparatus to perform the one or more methods, as detailed above and herein. Moreover, the system can include the computer-controlled manufacturing system.

Particular embodiments of the subject matter described in this specification can be implemented to realize one or more of the following advantages. Automatic or semi-automatic generation of probe points can reduce the burden on an end-user to select which points to use for performing part inspection and/or part alignment, and which may result in increased accuracy of the resulting measurements. An optimized set of probe points can include a minimum number of points required to perform the part/surface inspection and/or alignment, where the optimized set of probe points are spread across the part. Using a minimum number of points to perform the part/surface inspection and/or alignment can reduce an amount of time to perform the measurements by omitting unnecessary sampling of extraneous probe points.

In some implementations, the optimized set of probe points can include a set of points to lock in a number of degrees of freedom specified for the system performing the measurement.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Part alignment and/or surface inspection of a part within a manufacturing system, e.g., a CNC machine, can be performed prior, during, and/or after a manufacturing process, e.g., subtractive and/or additive manufacturing. A set of inspection points for performing the part alignment and/or surface inspection is selected, where each inspection point is a point where the manufacturing system will collect a probe measurement, in order to collect physical information about the part, e.g., location and/or surface characteristics. Generating the set of inspection points from a three-dimensional model of a part can include balancing a number of measurement criteria, including identifying a number of inspection points that allow for at least a threshold of accuracy of understanding of the part and/or portion of the part of interest, reducing an amount of time to perform the measurement, collecting points that are spread across the part or portion of the part of interest, and locking one or more degrees of freedom of the part within the manufacturing system.

Figure 1:
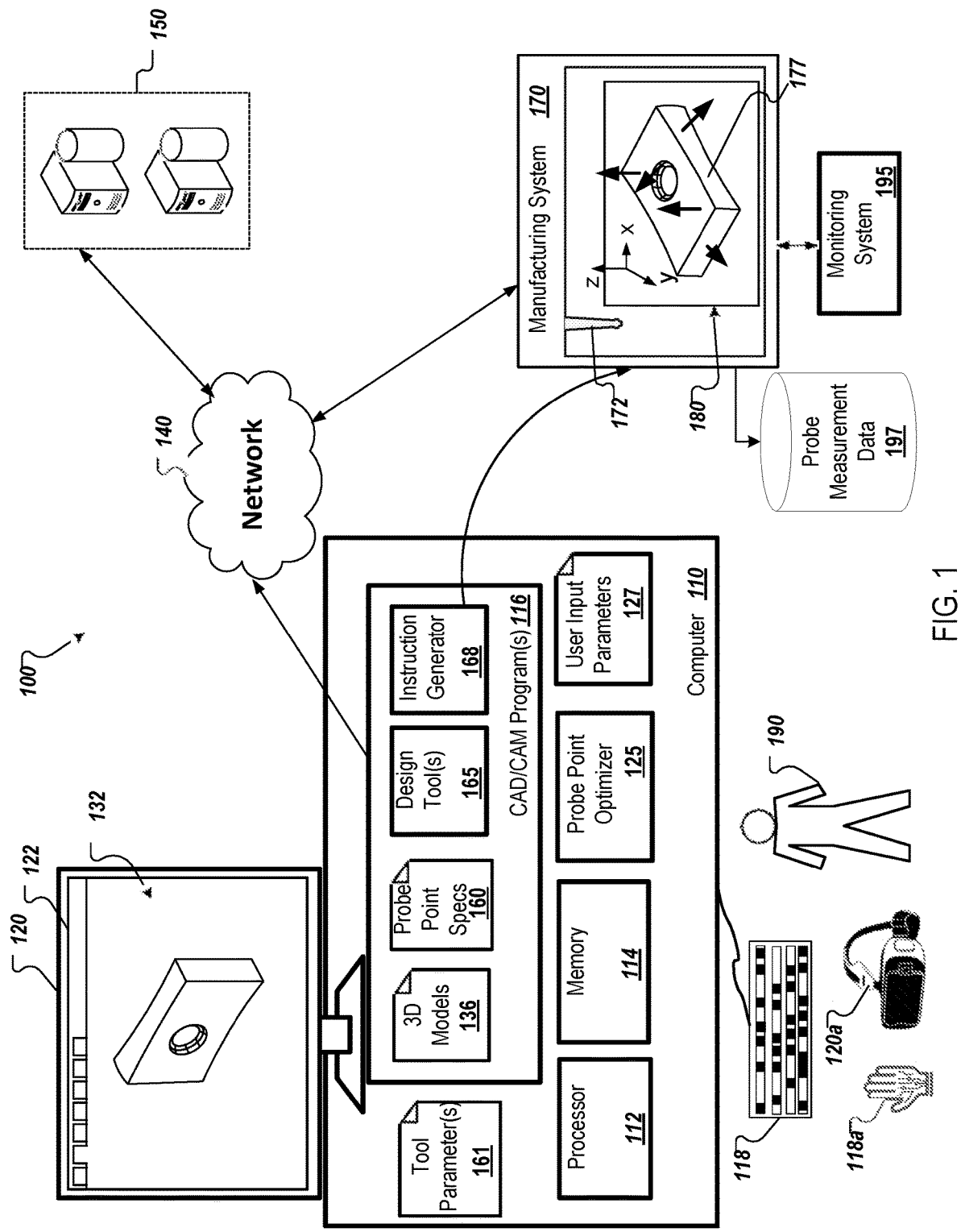
FIG. 1 shows an example of a system usable to design and manufacture physical structures.

FIG. 1 shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more three-dimensional (3D) modeling, simulation (finite element analysis or other) and manufacturing control programs such as Computer Aided Design (CAD) and/or Computer Aided Manufacturing (CAM) program(s) 116, also referred to as Computer Aided Engineering (CAE) programs, etc. A user 190 can interact with the program(s) 116 to create and/or load 3D models 132 of parts to be manufactured using a manufacturing machine 170, such as a multi-axis, multi-tool milling machine e.g., a Computer Numerical Control (CNC) machine. The program(s) 116 can run locally on computer 110, remotely on a computer of one or more remote computer systems 150, (e.g., one or more third party providers' one or more server systems accessible by the computer 110 via the network 140) or both, locally and remotely.

In some implementations, user 190 can provide user input parameters 127, for example, selected surfaces and/or bodies of a part to be probed, a threshold of accuracy for the measurement, and/or whether the user 190 is interested in a part alignment and/or surface inspection of the part 177. Input parameters 127 can be utilized by a probe point optimizer 125 to generate an optimized set of probe points for the manufacturing system 170 to perform one or more operations, e.g., surface inspection and/or part alignment.

The CAD/CAM Program(s) 116 can be computer programs having implemented logic for designing 3D models for parts to be machined from a workpiece and/or parts to be manufactured by additive manufacturing. Based on such defined 3D models a set of probe points can be defined to perform surface inspection and/or part alignment for a part or portion of a part in relation to machine components. An optimized set of probe points can be determined using a probe point optimizer 125 that outputs a set of optimized probe points to be utilized by a manufacturing system 170 to perform surface inspection and/or part alignment. Such probe point optimization can be implemented as part of the CAD/CAM program(s) 116, or as an external component communicatively coupled with the CAD/CAM program(s) 116.

The CAD/CAM program 116 presents a user interface (UI) 122 on a display device 120 of the computer 110, which can be operated using one or more input devices 118 of the computer 110, e.g., keyboard and mouse. Note that while shown as separate devices in FIG. 1, the display device 120 and/or input devices 118 can also be integrated with each other and/or with the computer 110, such as in a tablet computer or in a virtual reality (VR) or augmented reality (AR) system. For example, the input/output devices 118, 120 can include a VR input glove 118a and a VR headset 120a.

The CAD/CAM program(s) 116 may be associated with creating 3D models 136 (e.g., 3D model 132) for manufacturing systems, e.g., CNC manufacturing machines, through utilization of design tools 165 provided to the user 190. This can be done using known graphical user interface tools, and the 3D models 136 can be defined in the computer using various known 3D modeling formats, such as solid models or surface models (e.g., B-Rep (Boundary Representation (B-Rep)) and surface meshes). In addition, the user 190 can interact with the program(s) 116 to modify the 3D model 132 of the part, as needed.

In some implementations, a manufacturing system, such as the manufacturing system 170, can include powerful and highly accurate computer-controlled tools that perform repeated and precise movements to perform subtractive manufacturing and/or additive manufacturing. For example, manufacturing system 170 can be a hybrid CNC machine that performs both subtractive and additive manufacturing. The manufacturing system 170 can receive computer-generated code and convert it into electronic signals based on implemented logic at the CNC machine thus to reproduce movements by some machine components based on the received instructions. Instructions received at the CNC machine in relation to performing surface inspection, part alignment, and/or machining a part may be defined in terms of defining machine tool and/or probe motions, working bed (table) motions, or both.

Manufacturing system 170 includes one or more probe tools 172 which can be used to perform surface inspection, part alignment, or the like on a part 177. A probe tool 172 can include, for example, a mechanical contact probe, an optical measurement probe, e.g., a LASER, or the like. In general, embodiments can be applied to any suitable form of NC (numerically controlled) coordinate measuring device, each of which is referred to as a probe tool in this document, regardless of whether or not the probe tool comes into physical contact with the part. Probe tool 172 can be configured to measure probe points located at respective locations of the part, where the probe points can be, for example, points at which the probe tool 172 is brought into contact with the part 177 (for a mechanical contact probe). Measurement data, e.g., including a position at which contact was made with the part, is generated when a surface touch measurement and/or an edge touch measurement is performed. Though not depicted in FIG. 1, manufacturing system 170 can additionally include one or more machining components, e.g., for performing subtractive and/or additive manufacturing of part 177.

Manufacturing system 170 can have an associated set of tool parameters 161 stored by the programs 116, where tool parameters include information related to the operation of manufacturing system 170 and in particular, the probe tool 172, for example, probe geometry and probe orientation. Tool parameters 161 additionally may include information related to a working envelope of the manufacturing system 170, where the working envelope defines the range of motion and orientation through the range of motion of the probe tool 172.

Manufacturing system 170 includes a working bed 180, where the working bed 180 is configured to retain the part 177 within the manufacturing system 170. Working bed 180 can include a platform and one or more fixtures to retain and affix the part 177 during a surface inspection and/or part alignment measurement.

Manufacturing system 170, e.g., a CNC machine, may be broadly classified by a number of axes involved in moving when measuring parts, machining parts from workpieces, and/or 3D-printing parts by additive manufacturing. In some implementations, a manufacturing system 170 is a 3-axis CNC machine. However, it should be appreciated that other CNC machines, or more generally, other manufacturing systems 170, can include 4-axis, 5-axis, among others (e.g., a 2-axis machine, a 2.5-axis machine, etc.). Manufacturing system 170, in general, receives instructions for inspecting and/or aligning a workpiece in relation to at least one of the machine components, such as the instructions generated by the processes described below with reference to FIGS. 2, 3A, and 3B.

When the manufacturing system 170 is turned on, a machine operator may initiate a definition of a home position so that the manufacturing system 170 knows where probe component(s) are positioned and where the axes are for moving the probe component(s), such as probe tools performing the surface inspection and/or part alignment over the workpiece, in a work space (e.g., working envelope) at the table/bed 180. Once a home position is defined, the manufacturing system 170 defines a working coordinate system in relation to such a home position. The manufacturing system 170 can be a 3-axis machine defining a three-coordinate system, having an x-axis and a y-axis are defined on the layer of a working bed (or table), and a z-axis is defined for the movement of tools initiating contact with a workpiece when positioned on the working bed from above and moving in an up-ward and down-ward motion towards the workpiece to perform operations, such as surface inspection operations.

In some implementations, a workpiece is positioned on the working bed 180 of the manufacturing system 170 in relation to the home position to execute received instructions for performing tool measurements to inspect and/or align the part. The definition of the home position in the working envelope can be generated based on a provided position for the probing in relation to one or more of the machine components, e.g., probe tools 172, of the manufacturing system 170.

In some implementations, the working envelope is defined with respect to the working bed 180, where multiple linear rails are defined as part of a guiding system to allow positioning of a workpiece holder (e.g., a machine vise or other fixturing device) to affix the position of the workpiece for machining the part 177.

Manufacturing system 170 can include a monitoring system 195 configured to monitor processes of the manufacturing system 170, for example, the system can store log data for the execution of the operations of the system 170, where such log data may include metadata about the time of execution, positioning of the components, executed movements, configurations on the machine when the machining is performed, among other items.

In the example shown, the model 132 is a 3D model of a particular part 177 or a portion of a part, for example, a connector for attachment of manufactured parts into a larger system or machine. In some examples, the model 132 can be a 3D model of other parts such as a circuit board, a tool part, jewelry, among others. Many different types of models can be used with the systems and techniques described herein. In any case, the 3D model 132 can be used to facilitate performing surface inspection and/or part alignment by generating a set of probe points for use by the computer-controlled manufacturing system to take measurements of the part. For example, the 3D model 132 can be used to generate a probe point specification document 160, which can be sent to the manufacturing system 170 and used to control operation of one or more probe tools 172. The CAD/CAM program(s) 116 can include an instruction generator 168 that generates instructions in relation to performing surface inspection and/or part alignment of a part by the manufacturing system 170 based on a set of probe points, e.g., a probe path, such as the probe point specification 160.

In some implementations, instructions for performing surface inspection and/or part alignment including a probe path, can be generated based on an input provided by the user 190, or in light of the user's request for another action, such as sending the 3D model 132 to the manufacturing system 170, or other manufacturing machinery, which can be directly connected to the computer 110, or connected via a network 140, as shown. This can involve a post-process carried out on the local computer 110, or a cloud service, to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. The document may also include data for positioning for the machining, including an initial position for the workpiece, and other positions during the machining, for example, in relation to different setups defined for machining the part.

In some implementations, when a part is inspected or aligned within a system 170, different setups for the inspection and/or alignment can be defined with the probe point specification 160. Based on the probe point specification information associated with a setup, probe tool(s) 172 are instructed to move in relation to the positioning of the part or workpiece, and the part or workpiece location and orientations within the manufacturing system 170. Further, in some implementations, the computer 110 is integrated into the manufacturing system 170, and so the document 160 is created by the same computer that will use the document 160 to inspect and/or align the part 177.

At 210, information regarding a geometry of a part to be machined by a computer-controlled manufacturing system from a workpiece is obtained. In some implementations, the information can be a received 3D model of the part to be machined. Based on the 3D model of the part, a toolpath specification for machining the part can be generated, for example, based on logic for toolpath generation, such as the logic implemented at the CAD/CAM program(s) 116 of FIG. 1. In some implementations, the information can be a received probe path specification for the geometry of the part, for example, provided by a CAD/CAM program in relation to a request to generate a specification for probing a part of a certain geometry. In some implementations, the provided probe path specification may be usable by the computer-controlled manufacturing system to machine at least a portion of the geometry of the part from the workpiece.

Figure 2:
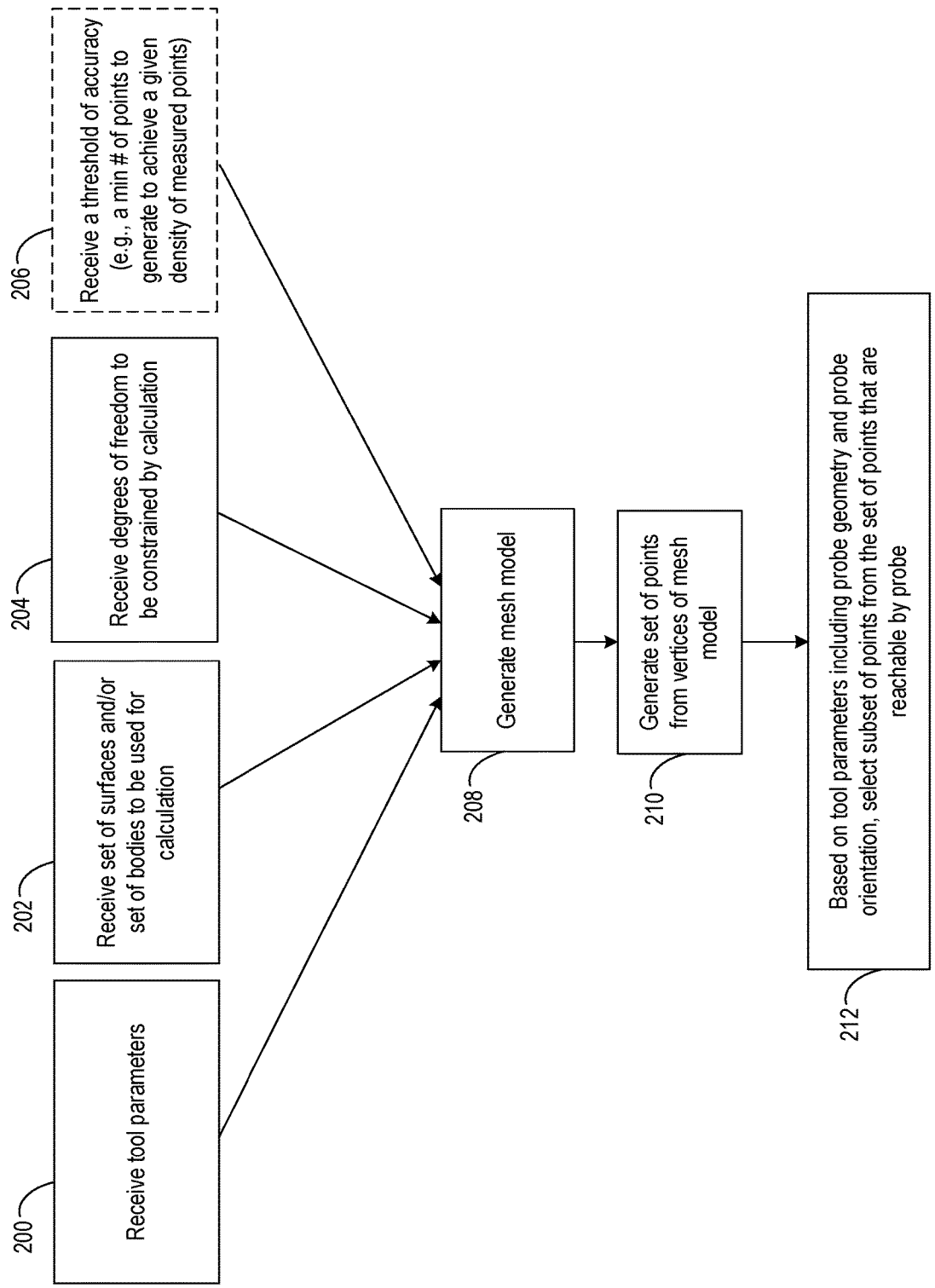
FIG. 2 shows an example of a process to generate probe points for performing surface inspection and/or part alignment.
Figure 3A:
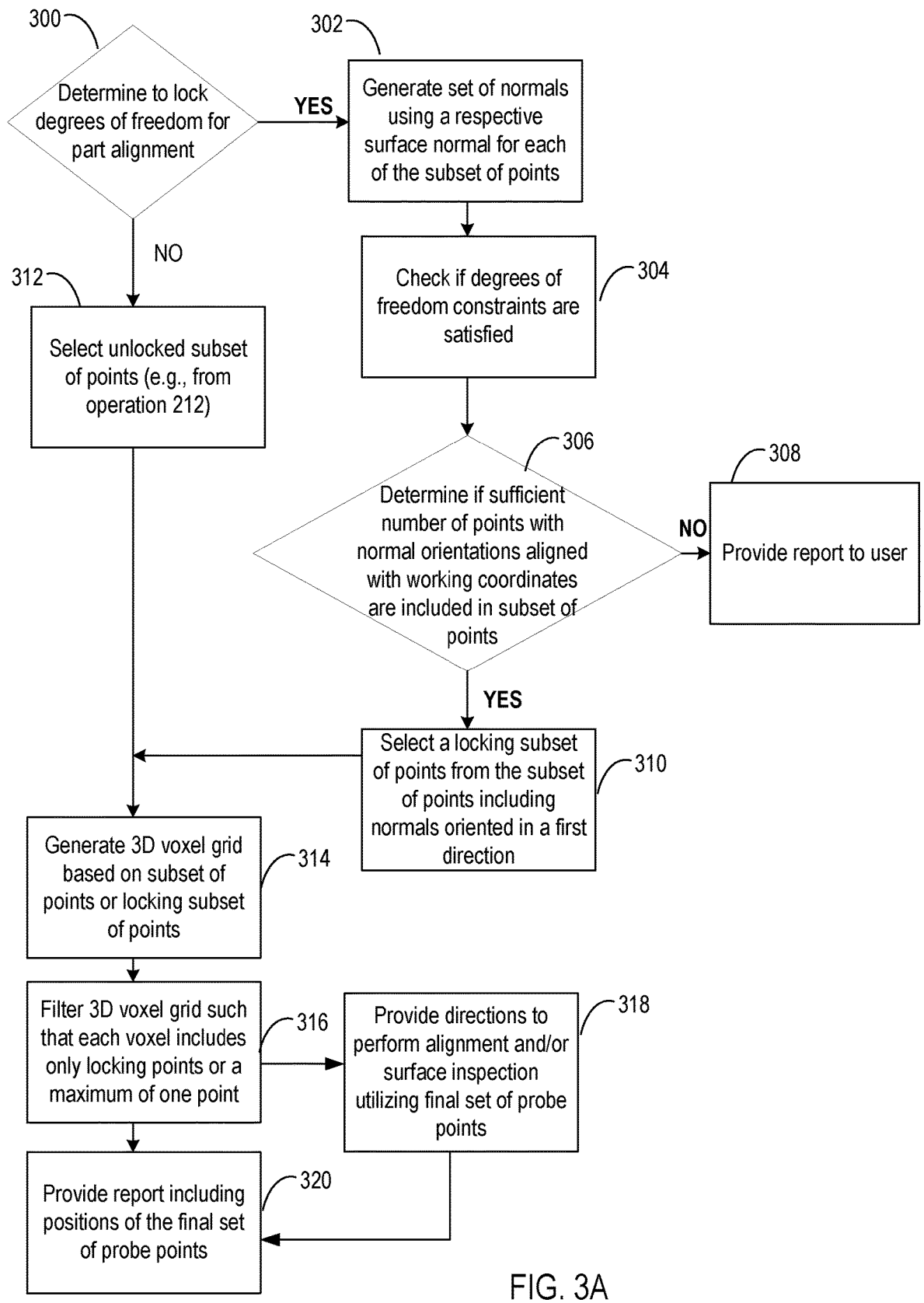
FIG. 3A shows another example of a process to generate probe points for performing surface inspection and/or part alignment.
Figure 3B:
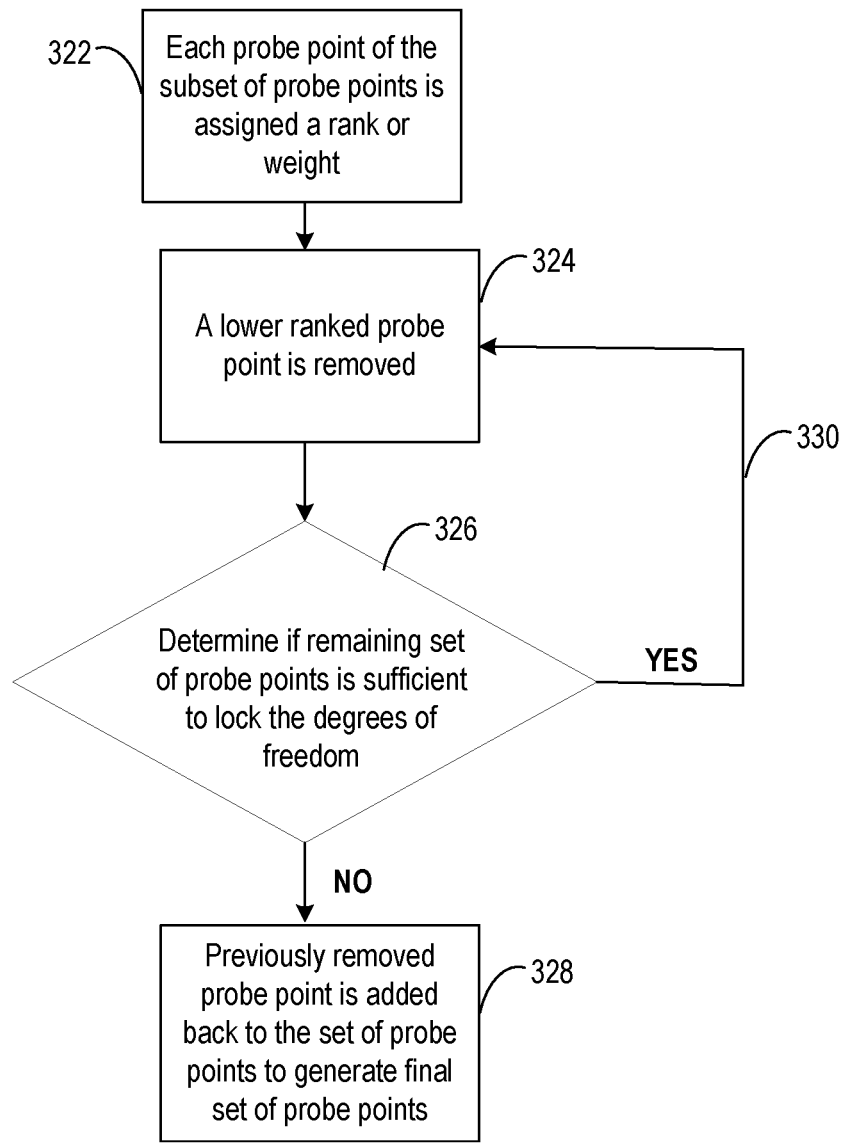
FIG. 3B shows another example of a process to generate probe points for performing surface inspection and/or part alignment.

FIGS. 2, 3A, and 3B show examples of processes for probe point generation, implemented by the system 100 described with respect to FIG. 1. For example, the processes of FIGS. 2, 3A and 3B can be implemented as part of a computer-aided design or manufacturing program 116 running in relation to a computer-controlled manufacturing system 170 for measuring and/or machining parts from workpieces of different material and shape. In yet another example, the processes of FIGS. 2, 3A, and 3B can be executed outside of a CAD/CAM program, at a separate program including implemented logic for probe point generation, e.g., by probe point optimizer 125. The process output can be fed into such a CAD/CAM program 116 or directly provided to a computer-controlled manufacturing system 170 for measuring and/or machining parts from workpieces, such as the manufacturing system 170 of FIG. 1.

At 200, the system receives tool parameters including probe geometry and probe orientation for the manufacturing system 170. Tool parameters 161 can include probe geometry and probe orientation of probe tool 172. Tool parameters 161 can depend in part on a particular probe tool 172 utilized and the measurement to be performed, e.g., part alignment and/or surface inspection. In some implementations, tool parameters 161 can include information related to the configuration of the manufacturing system, e.g., available degrees of freedom, fixtures for part retention, working envelope of the system 170, and the like. A user 190 may specify further tool parameters, e.g., specify a type of measurement to be performed, a type of probe tool 172 to be utilized for the measurement, etc. Tool parameters 161 can be used by the probe point optimizer 125 to filter a set of final probe points such that each point in the set of final probe points is reachable by a current configuration of the probe tool and manufacturing system.

At 202, the system receives a set of surfaces and/or set of bodies of the part or portion of the part to be used for the measurement. A user may provide user input parameters 127 including specifying one or more surfaces, one or more solid bodies, or a combination thereof, to indicate at least a portion of the three-dimensional model of the part for the measurement. The set of surfaces and/or set of bodies can be indicated through a user interaction with the 3D model 132 in the graphical user interface 122.

At 204, the system can receive a number of degrees of freedom to be constrained. In some implementations, a user 190 can specify the degrees of freedom to be constrained, e.g., in the case of part alignment. The number of degrees of freedom to be constrained can depend on a particular part, where a minimum number of probe points to lock the degrees of freedom will depend on the part configuration. In some implementations, a minimum of six probe points are required to lock the degrees of freedom of a three-dimensional part. Locking the degrees of freedom serves the purpose to constrain the part to a particular orientation with certainty, in other words, by locking the degrees of freedom, the manufacturing system 170 will be able to establish an orientation of the part.

Optionally, at 206, the system can receive a threshold accuracy for the measurement, e.g., for a part alignment measurement. In some implementations, the user 190 can provide user input parameters 127 specifying a threshold accuracy for the measurement, for example, by specifying an approximate distance between probe points, a probe point density, and/or a number of total points for the measurement. In another example, a user 190 can specify a total time to perform the measurement. User input parameters 127 specifying a threshold accuracy can be utilized to determine a size of voxels of the mesh model, as described below, which can ultimately determine a spread of the final probe points generated for the measurement. A threshold of accuracy can be, for example, a minimum number of points for the system to generate in order to achieve a given density of measured points.

Figure 4A:
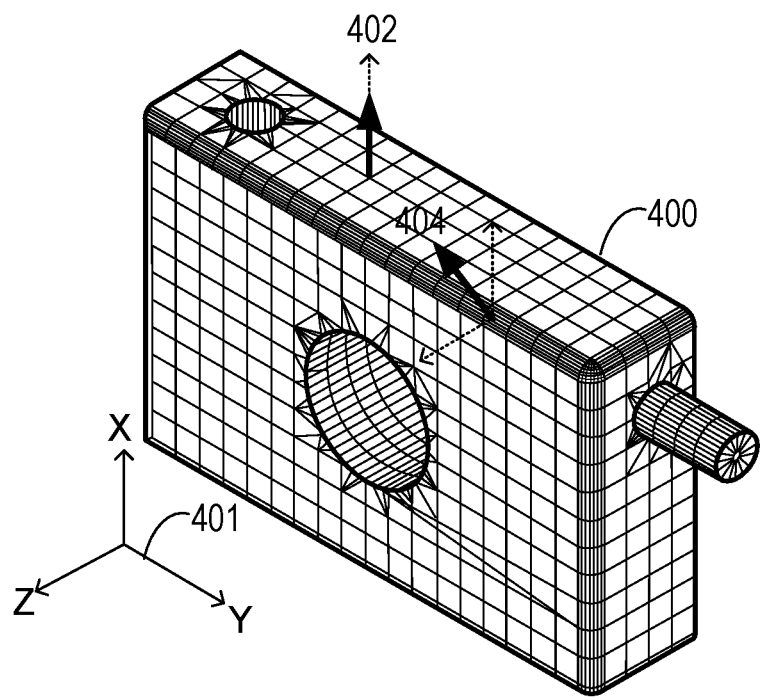
FIGS. 4A and 4B show example schematics of a mesh model and probe points for the mesh model.

At 208, the system generates a mesh model of the 3D model. Generating the mesh model includes converting at least a portion of the 3D model 132 of the part 177 into the mesh model using a minimum length for edges between the vertex points defined in accordance with a size of a probe tool 172 to be used in the part alignment or surface inspection of the part by the computer-controlled manufacturing system 170. The mesh model can be, for example, a triangular mesh model, a polygonal mesh model, or the like. In some implementations, as depicted in FIG. 4A, the 3D model 132 is converted by the system to a mesh model 400, where the size of the voxels can be determined in part on a size of the probe tool 172. In some implementations, a mesh model can be provided to the system, e.g., received as input to system 100 from an external source.

Referring back to FIG. 2, at 210, the system generates, from the mesh model, a set of points, where the points represent vertices of the mesh model. The vertex points of the mesh model form an initial set of probing points in a three dimensional space of a working coordinate system for manufacturing system 170 (e.g., depending on the degrees of freedom of the system 170). The initial set of probing points can include an excess of probe points, some of which are filtered by later operations in the processes described with reference to FIGS. 2, 3A, and 3B. For example, probe points from the initial set of probing points may include multiple points along a same surface where, and one or more of the multiple points can be filtered out by the probe point optimizer 125 to form a final set of probe points.

At 212, the system selects a subset of points from the initial set of probing points based on the received tool parameters. As described above, tool parameters 161 can include probe geometry and probe orientation, as well as information related to a working envelope of the system 170. Probe points located in a three dimensional space that are not reachable by the probe tool 172 are excluded from the initial set of probing points. In other words, any of the probe points from the initial set of probing points that are not accessible in the one or more available orientations of the probe tool 172 within the working envelope for the part when the part is fixtured (e.g., affixed to the working bed 180) in the manufacturing system 170 are excluded.

Referring now to FIG. 3A, at 300, the system determines how to lock the degrees of freedom, e.g., to perform a part alignment measurement. User 190 can provide instructions, e.g., user input parameters 127, indicating an intent to perform a part alignment measurement using a set of generated probe points. In some implementations, to perform part alignment, the degrees of freedom of the part relative to the manufacturing system 170 can be locked to ensure accurate understanding of a part location and orientation within the working envelope. For example, locking the degrees of freedom for a 3-axis system can require a minimum of six probe points to lock all three dimensions. In some implementations, the system need not lock the degrees of freedom, e.g., for surface inspection measurements, as described below with reference to operation 312 below.

In some implementations, the system identifies a minimum set of points required to lock the degrees of freedom. The system can select probe points from the initial set of probing points based on a vector alignment of each probe point with at least one axis of the working coordinate system of the manufacturing system 170 to ensure good alignment for each of a first three of the axes of manufacturing. Referring now to FIG. 4A, vectors 402 and 404 normal to a respective vertex of the mesh model 400 may be aligned to varying degrees to the working coordinate system 401 of the manufacturing system 170. In the example presented in FIG. 4A, vector 402 is aligned with the x-axis of the working coordinate system 401, and vector 404 is oriented along the x-z plane of the working coordinate system 401.

At 302, the system generates a set of normal vectors using respective surface normals for each of the subset set of points from operation 212. Each normal vector corresponding to a probe point of the subset of probe points is normal to a surface of the 3D model of the part and located at a vertex point of the mesh model. Each of the normal vectors for respective probe points corresponding to a vertex point is assigned to respective axes of manufacturing available in the working coordinate system of the computer-controlled manufacturing system in accordance with a degree of alignment between the vector for each vertex point and each one of the respective axes of manufacturing. For example, as depicted in FIG. 4A, vector 402 is aligned to the x-axis of the working coordinate system 401. Vector 404 is aligned to a first degree to the x-axis and aligned to a second degree to the z-axis of the working coordinate system 401. Though described here with reference to a 3-axis system, the processes described herein can be performed for 3+ axis systems (e.g., 4-axis system, 5-axis system), as well as 2 and 2.5 axis systems. Systems including 3+ axes, e.g., 5-axis or 3+1 axis systems, can enable additional access to part features that may not be accessible on a 3-axis system. Measurements on systems that are 3+ axes can be facilitated by rotary axis or axes of a probe head including the probe tool can alter a probe tool axis angle, such that the probe tool axis is pointing in a direction other than normal to the x-y plane. In some implementations, the processes described herein can be performed by an industrial robot, e.g., a 6-axis robot.

Referring back to FIG. 3A, in operation 304, the system performs a check to determine if the degrees of freedom constraints are satisfied. The system may determine that a minimum number of probe points with corresponding normal vectors that are aligned in each of the respective axes of manufacturing remain in the subset of probing points to lock degrees of freedom for the part alignment. In one example, to lock all six degree of freedom, three points are required which are each oriented approximately along a first main direction (e.g., along the z-axis), two points which are each oriented approximately along a second main direction (e.g., along the y-axis) and one point which is oriented approximately along a third main direction (e.g., along the x-axis), for a total of six points.

In some implementations, a deviation from the main directions, e.g., the working coordinates of the system, can influence a minimum number of point needed to lock the degrees of the freedom of the part. For example, larger deviations of the normal vectors corresponding to respective probe points from the working coordinates of the system (e.g., x,y,z axes) can result in more probe points being required to achieve a good alignment and/or lock in the degrees of freedom.

At 306, the system determines if a sufficient number of points with normal orientations aligned with the working coordinate system and sufficiently distributed across the mesh model are included in the subset of points. In some implementations, probe points are filtered out from the initial set of probing points based on coverage of the portion of the 3D model of the part to generate a final set of probing points in the 3D space of the working coordinate system of the system. In other words, the selected subset of points includes probe points from the initial set of probing probes that are spread across the surface of the mesh model of the three dimensional part.

In some implementations, probe points are filtered out from the initial set of probing points based on spread of the probe points across the surfaces of the 3D model of the part, e.g., to ensure evenly distributed probe points across the surfaces of the 3D model of the part. The spread of selected probe points can be controlled by the voxel grid, such that there is at least one valid point in each voxel. The size of the voxels, and therefore the density of points, can be controlled by an accuracy threshold, e.g., the accuracy threshold provided by the user 190 as a user input parameter 127. For example, smaller voxels for a mesh model yields an increased number of probe points, which can result in higher accuracy of the measurement as well as an increase in an amount of time to collect the measurement, whereas larger voxels (for a same mesh model) yields a decreased number of probe points, which can result in lower accuracy of the measurement as well as a decrease in an amount of time to collect the measurement.

In some implementations, the system determines that the primary axes of motion of the system, e.g., three primary axis of motion, are insufficient to lock the degrees of freedom of the part. The system may optionally include additional axes of motion, e.g., provided by reorientation of the probe tool, the part, or a combination thereof. For a system including one or more additional axes of motion, an additional axis of manufacturing can be selected, e.g., at least a fourth axis of manufacturing for the manufacturing system 170 can be selected, when the selected points are not sufficient to lock the degrees of freedom. The system can add to the initial set of probing points additional points that are reachable by the probe tool using the at least a fourth axis of manufacturing. To add the additional probe points to the initial set of probing points, the system can select probe points from the additional points based on a vector alignment of each probe point with at least one axis of manufacturing to ensure good alignment for each of the first three of the axes of manufacturing and complete the minimum set of points required to lock the degrees of freedom.

At 308, when the system determines that the number of points with normal orientations that are approximately aligned along one of the directions of the working coordinates of the system (e.g., aligned with the x, y, or z-axis) are included in the subset of points is insufficient, the system may generate a report and provide the report to a user 190. The report may include suggested remediation steps, e.g., selection of additional surfaces, adjustment of one or more of the user input parameters 127. Remediation steps provided to the user can include a request to alter the configuration of the system, e.g., switch to a different probe tool, enable additional degrees of freedom of the system, re-orient the part to allow access to a different set and/or additional surfaces, or the like.

At 310, when the system determines that the number of points with orientations that are approximately aligned along one of the directions of the working coordinates of the system (e.g., aligned with the x, y, or z-axis) are included in the subset of points is sufficient, the system defines a locking subset of points from the final points, where the locking subset of points includes the minimum number of points possible to produce a fully constrained alignment.

In some implementations, as depicted at 312, the system determines to not lock the degrees of freedom of the 3D mesh model, e.g., for purposes of surface inspection. When the system determines to not lock the degrees of freedom, an unlocked subset of probe points is selected, e.g., the subset of points yielded from operation 212 can be utilized for performing the surface inspection measurement. Surface inspection may not require locking degrees of freedom, where the surface inspection is utilized to the confirm a quality of the part. For purposes of surface inspection, probe points can be generated for the measurement of the part where a calculated deviation of the measured probe point from the nominal part on the CAD model is used to determine an accuracy of the part. For surface inspection, a spread of points on the part is desirable, as well as to be sure that the probe tool can access each of the set of probe points, e.g., not restricted access due to fixturing or position of the part in the working envelope.

In some implementations, a user can provide user input parameters 127 including a number of points for the measurement and/or a time to perform the measurement that the system uses to extrapolate a number of points for which it has time to collect the measurements, e.g., the surface inspection or part alignment.

At 314, from either the locked subset or the unlocked subset of points, the system generates a 3D voxel grid including multiple voxels. A resolution of the set of voxels of the 3D voxel grid can be determined in accordance with a specified level of point density.

Figure 4B:
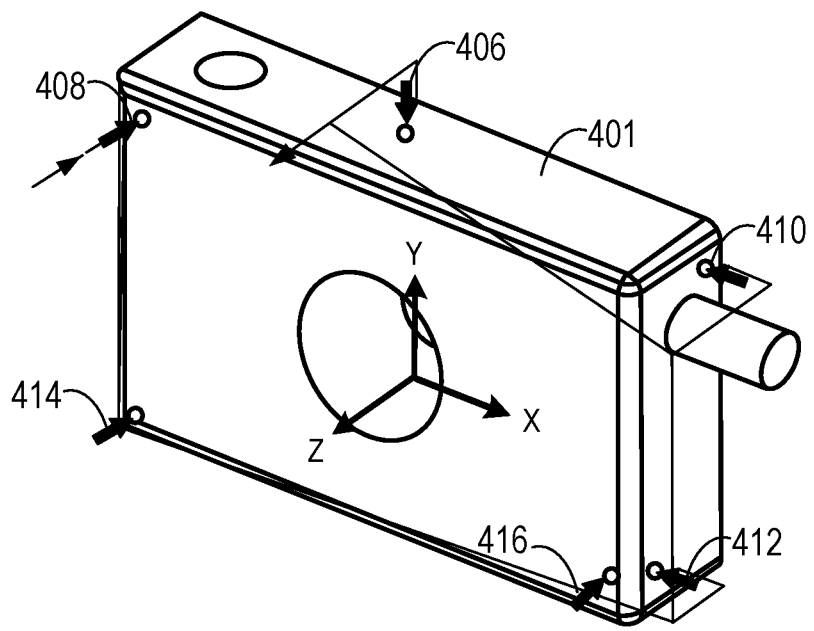

At 316, the system filters the 3D voxel grid such that each voxel includes at most one point or only includes locking points from the locked subset. Filtering can include removing probe points located within voxels of the set of voxels until each voxel contains only one point or only points included in the minimum set of points previously identified as required to lock the degrees of freedom. For example, as depicted in FIG. 4B, probe points 406, 408, 410, 412, 414, and 416 represent a filtered set of probe points that can be utilized for a final set of probe points. Each of probe points 406-416 can represent a locking point for a locked subset and/or such that each voxel at most includes one point. Moreover, the set of probe points as depicted in FIG. 4B are spread across the part 401 to ensure measurements across the part 401.

In some implementations, filtering probe points from an initial set of probing points can be performed using a binary tree. For example, once the initial set of probing points are known to lock the degrees of freedom by a set of locked probe points, a binary tree can be utilized to identify probe points from the voxels of the mesh model. In other words, once the locked probe points are determined, additional points can be added to reach a density of points to get a desired accuracy threshold. The probe point optimizer 125 can optimize a number of final probe points based on an interplay between accuracy of the measurement and a speed of measurement. Further discussion of filtering a locking subset of probe points to optimize and/or minimize the locking probe points included in the final set of probe points is found below with reference to FIG. 3B.

At 318, the system provides directions to a manufacturing system, e.g., CNC machine, to perform alignment and/or surface inspection of the part utilizing the final set of probe points. Providing the directions can include generating, from the final set of probe points, directions for performing the surface inspection and/or part alignment, e.g., code for operating a CNC machine, by the computer-controlled manufacturing system.

In some implementations, the manufacturing system 170 receives the directions for performing the surface inspection and/or part alignment and executes the directions to perform the surface inspection and/or part alignment, including performing the measurements at the final set of probe points. For each measurement performed by the manufacturing system 170, the manufacturing system 170 can store measurement results in probe measurement data 197. The probe measurement data 197 can be utilized by the system, e.g., program 116, to calculate part alignment and/or surface inspection.

In some implementations, the program 116 can perform comparison between a position of a probe point with reference to the 3D model and a measured position of the probe point on the part to determine alignment or surface inspection information. In some implementations, the probe measurement data 197 is provided to the program 116 with the 3D model utilized to generate the final set of probe points, e.g., where the probe measurement data 197 is imported to the program 116 together with an original CAD model of the part that was utilized to generate the probe points In some implementations, probe measurement data 197 is utilized by the system in subsequent processes, e.g., code executed on a CNC machine to perform subtractive and/or additive manufacturing. The probe measurement data 197 can be utilized to adjust coordinates of the manufacturing system movements, e.g., by machining tools, and/or can be utilized to adjust working coordinates for the manufacturing system.

At 320, the system provides a report to the user includes positions of the final set of probe points from the 3D voxel grid. The system can provide results including, for example, location of the final set of probe points, probe measurement data 197 corresponding to the final set of probe points, or the like. The report can include details regarding alignment errors and/or surface inspection information.

In some implementations, filtering the locking probe points, e.g., operation 316, includes selecting an optimal set of the probe points that lock the degrees of freedom. Selecting the locking probe points can include ranking the probe points based on an orientation of the normal vectors corresponding to each probe point. FIG. 3B is a flow diagram of an example process for filtering the locking subset of points.

In 322, each probe point of the subset of probe points, e.g., the locking set of probe points of operation 312, can be assigned a rank or weight based on a degree to which the probe point is oriented along an axis of the machine system (e.g., respective axis of manufacturing). In some implementations, ranking of the probe points can include assigning respective weights to each of the probe points according to the respective vectors for the probe points. The weights can correspond to one or more of a degree to which the vector is aligned with an axis of manufacturing, a location of the probe point with respect to each other probe point, a proximity to a feature of interest of the 3D model of the part, part shape, or the like. For example, a probe point in a portion of the 3D model that includes a low density of probe points may be assigned a higher weight than a probe point in a portion of the 3D model that includes a high density of probe points. In another example, a probe point located within a threshold proximity to or on a feature of interest (e.g., a counterbore hole, lettering, etc.), of the part may be assigned a higher weight than a probe point located along a flat surface of the 3D model. In yet another example, a probe point located along a curvature of the part may be assigned a higher weight than a probe point located along a flat surface of the 3D model.

In 324, a lower ranked probe points is removed, e.g., a lowest ranked probe point, a lower ranked probe point that is aligned along an axis that is not a z-axis, etc. In some implementations, one probe point is removed from the subset of probe points in an iterative process, where the system removes a probe point (e.g., a lower ranked probe point) and then verifies if the degrees of freedom remain locked. Alternatively, two or more probe points can be removed from the subset of probe points at a time. The decision by the system to remove a particular probe point of the set of probe points can depends in part on an assigned weight or ranking, e.g., a lowest ranked probe point is removed.

In 326, the system determines if the remaining set of probe points maintain coverage (e.g., lock the degrees of freedom) of the least a portion of the three dimensional model of the part after removing the one or more lower ranked probe points. In other words, the minimum number of points in each of the respective axes of manufacturing remain by not removing any higher ranked points to form a minimum set of points previously identified as required to lock the degrees of freedom.

In 328, the system determines that the coverage is not maintained, e.g., the remaining set of probe points is insufficient to lock the degrees of freedom. In some implementations, the system will determine to add back the removed probe point. The set of remaining probe points including the added probe point that was previously removed is selected as the final set of probe points, e.g., as described in operation 316.

In 330, the system determines that coverage is maintained, e.g., that the remaining set of probe points is sufficient to lock the degrees of freedom. The system can continue removing lower ranked points in the iterative process described in operations 326 and 328.

Figure 5:
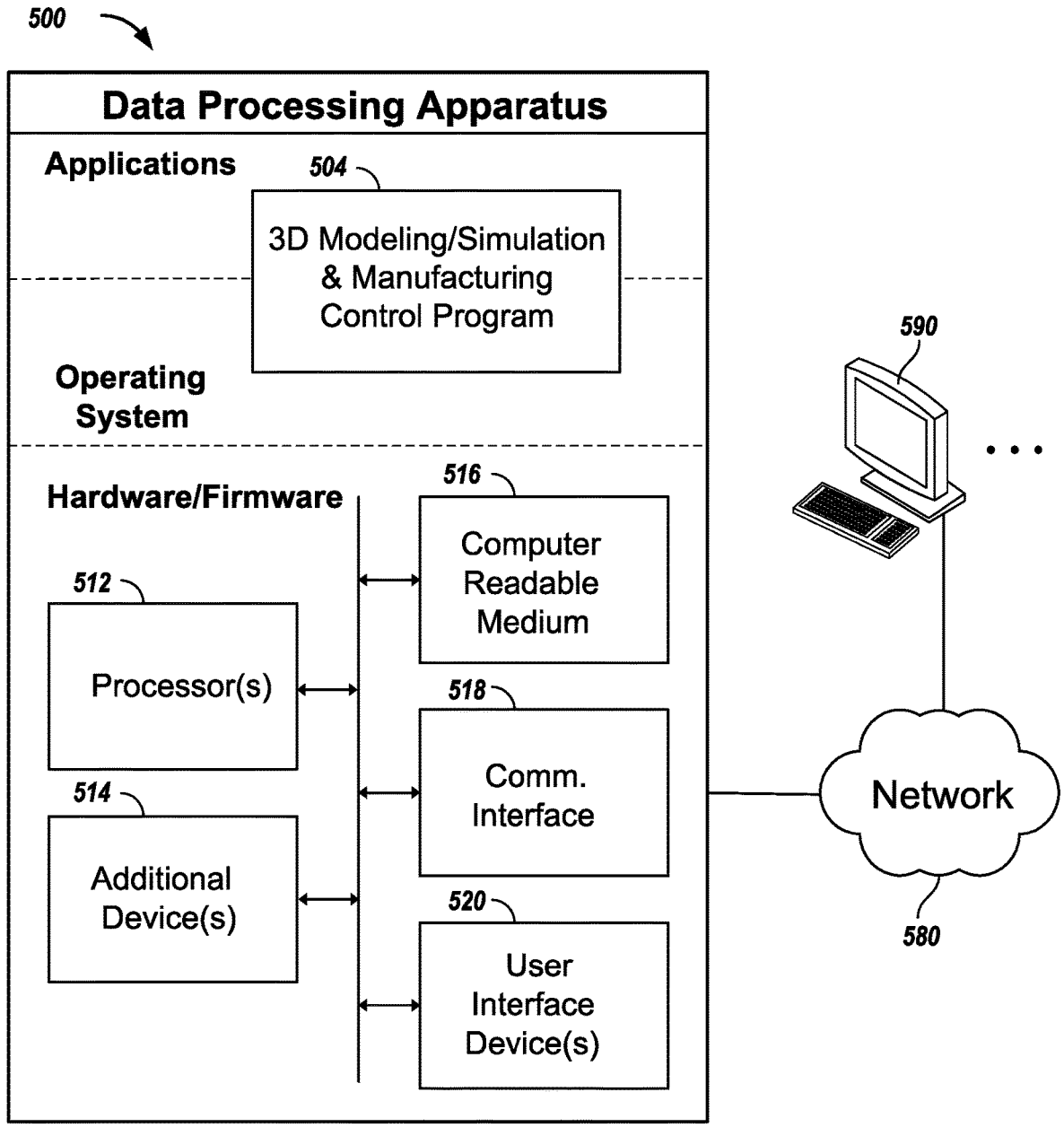
FIG. 5 is a schematic diagram of a data processing system usable to implement the described systems and techniques.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of a 3D modeling/simulation and manufacturing control program 504 that implement the systems and techniques described above. The number of software modules used can vary from one implementation to another. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses the communication interface 518 to communicate with one or more computers 590, for example, over the network 580. Examples of user interface devices 520 include; a display; camera; speaker; microphone; tactile feedback device; keyboard; mouse; and VR and/or AR equipment. The data processing apparatus 500 can store instructions that implement operations associated with the program(s) described above, for example, on the computer readable medium 516 or one or more additional devices 514, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions, and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including: semiconductor memory devices (e.g., Erasable Programmable Read-Only Memory (EPROM) and Electrically Erasable Programmable Read-Only Memory (EEPROM); flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD), an organic light emitting diode (OLED), or another monitor for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A computer-implemented method comprising:
    obtaining a mesh model of at least a portion of a three dimensional model of a part to be manufactured using a computer-controlled manufacturing system;
    collecting vertex points from the mesh model to be an initial set of probing points in a three dimensional space of a working coordinate system of the computer-controlled manufacturing system;
    filtering out points from the initial set of probing points based on coverage of the at least a portion of the three dimensional model of the part to produce a final set of probing points in the three dimensional space of the working coordinate system of the computer-controlled manufacturing system; and
    providing the final set of probing points for use in alignment or surface inspection of the part by the computer-controlled manufacturing system.

2. The computer-implemented method of claim 1, wherein the obtaining comprises converting the at least a portion of the three dimensional model of the part into the mesh model using a minimum length for edges between vertex points defined in accordance with a size of a probe tool to be used in the alignment or surface inspection of the part by the computer-controlled manufacturing system, and the collecting comprises excluding from the initial set of probing points any point in the three dimensional space that is not reachable by the probe tool due to a geometry of the probe tool and one or more available orientations of the probe tool within a working envelop for the part when fixtured in the computer-controlled manufacturing system.

3. The computer-implemented method of claim 2, wherein the alignment or surface inspection of the part comprises part alignment, and the method comprises:
    finding a vector for each vertex point in the initial set of probing points, the vector for the vertex being normal to a surface of the part at the vertex point; and
    assigning the vertex points to respective axes of manufacturing available in the working coordinate system of the computer-controlled manufacturing system in accordance with a degree of alignment between the vector for each vertex point and each one of the respective axes of manufacturing;
    wherein the filtering comprises ensuring a minimum number of points in each of the respective axes of manufacturing remain in the final set of probing points to lock degrees of freedom for the part alignment.

4. The computer-implemented method of claim 3, wherein the assigning comprises ranking the vertex points in the respective axes of manufacturing, and the filtering comprises:
    removing lower ranked points assigned to respective ones of the axes of manufacturing while maintaining coverage of the at least a portion of the three dimensional model of the part; and
    ensuring the minimum number of points in each of the respective axes of manufacturing remain by not removing any higher ranked points forming a minimum set of points previously identified as required to lock the degrees of freedom.

5. The computer-implemented method of claim 4, comprising producing a set of voxels over the initial set of probing points, wherein a resolution of the set of voxels is determined in accordance with a specified level of point density, and the filtering comprises removing points located within the voxels of the set of voxels until each voxel contains only one point or only points included in the minimum set of points previously identified as required to lock the degrees of freedom.

6. The computer-implemented method of claim 5, comprising receiving user input specifying (i) one or more surfaces, solid bodies or both to indicate the at least a portion of the three dimensional model of the part, (ii) the probe tool to be used, (iii) the degrees of freedom to be constrained, (iv) the specified level of point density, (v) alignment, surface inspection or both are to be performed, or (vi) a combination of two or more thereof.

7. The computer-implemented method of claim 4, comprising identifying the minimum set of points required to lock the degrees of freedom, the identifying comprising:
    selecting points from the initial set of probing points based on each point's vector alignment with at least one axis of manufacturing to ensure good alignment for each of a first three of the axes of manufacturing;
    selecting at least a fourth axis of manufacturing when the selected points are not sufficient to lock the degrees of freedom;
    adding, to the initial set of probing points, additional points that are reachable by the probe tool using the at least a fourth axis of manufacturing; and selecting points from the additional points based on each point's vector alignment with at least one axis of manufacturing to ensure good alignment for each of the first three of the axes of manufacturing and complete the minimum set of points required to lock the degrees of freedom.

8. The computer-implemented method of claim 1, wherein the providing comprises directing the computer-controlled manufacturing system to perform the alignment or surface inspection of the part using the final set of probing points.

9. A system comprising:
a data processing apparatus including at least one hardware processor; and
a non-transitory computer-readable medium encoding instructions of a computer-aided design program, the instructions being configured to cause the data processing apparatus to obtain a mesh model of at least a portion of a three dimensional model of a part to be manufactured using a computer-controlled manufacturing system;
collect vertex points from the mesh model to be an initial set of probing points in a three dimensional space of a working coordinate system of the computer-controlled manufacturing system;
filter out points from the initial set of probing points based on coverage of the at least a portion of the three dimensional model of the part to produce a final set of probing points in the three dimensional space of the working coordinate system of the computer-controlled manufacturing system; and
provide the final set of probing points for use in alignment or surface inspection of the part by the computer-controlled manufacturing system.

10. The system of claim 9, wherein the obtaining comprises converting the at least a portion of the three dimensional model of the part into the mesh model using a minimum length for edges between the vertex points defined in accordance with a size of a probe tool to be used in the alignment or surface inspection of the part by the computer-controlled manufacturing system, and the collecting comprises excluding from the initial set of probing points any point in the three dimensional space that is not reachable by the probe tool due to a geometry of the probe tool and one or more available orientations of the probe tool within a working envelop for the part when fixtured in the computer-controlled manufacturing system.

11. The system of claim 10, wherein the alignment or surface inspection of the part comprises part alignment, and the method comprises:
finding a vector for each vertex point in the initial set of probing points, the vector for the vertex being normal to a surface of the part at the vertex point; and
assigning the vertex points to respective axes of manufacturing available in the working coordinate system of the computer-controlled manufacturing system in accordance with a degree of alignment between the vector for each vertex point and each one of the respective axes of manufacturing;
wherein the filtering comprises ensuring a minimum number of points in each of the respective axes of manufacturing remain in the final set of probing points to lock degrees of freedom for the part alignment.

12. The system of claim 11, wherein the assigning comprises ranking the vertex points in the respective axes of manufacturing, and the filtering comprises:

removing lower ranked points assigned to respective ones of the axes of manufacturing while maintaining coverage of the at least a portion of the three dimensional model of the part; and
ensuring the minimum number of points in each of the respective axes of manufacturing remain by not removing any higher ranked points forming a minimum set of points previously identified as required to lock the degrees of freedom.

13. The system of claim 12, comprising identifying the minimum set of points required to lock the degrees of freedom, the identifying comprising:
selecting points from the initial set of probing points based on each point's vector alignment with at least one axis of manufacturing to ensure good alignment for each of a first three of the axes of manufacturing;
selecting at least a fourth axis of manufacturing when the selected points are not sufficient to lock the degrees of freedom;
adding, to the initial set of probing points, additional points that are reachable by the probe tool using the at least a fourth axis of manufacturing; and
selecting points from the additional points based on each point's vector alignment with at least one axis of manufacturing to ensure good alignment for each of the first three of the axes of manufacturing and complete the minimum set of points required to lock the degrees of freedom.

14. The system of claim 9, wherein the providing comprises directing the computer-controlled manufacturing system to perform the alignment or surface inspection of the part using the final set of probing points.

15. A non-transitory computer-readable medium encoding instructions operable to cause data processing apparatus to perform operations comprising:
obtaining a mesh model of at least a portion of a three dimensional model of a part to be manufactured using a computer-controlled manufacturing system;
collecting vertex points from the mesh model to be an initial set of probing points in a three dimensional space of a working coordinate system of the computer-controlled manufacturing system;
filtering out points from the initial set of probing points based on coverage of the at least a portion of the three dimensional model of the part to produce a final set of probing points in the three dimensional space of the working coordinate system of the computer-controlled manufacturing system; and
providing the final set of probing points for use in alignment or surface inspection of the part by the computer-controlled manufacturing system.

16. The non-transitory computer-readable medium of claim 15, wherein the obtaining comprises converting the at least a portion of the three dimensional model of the part into the mesh model using a minimum length for edges between the vertex points defined in accordance with a size of a probe tool to be used in the alignment or surface inspection of the part by the computer-controlled manufacturing system, and the collecting comprises excluding from the initial set of probing points any point in the three dimensional space that is not reachable by the probe tool due to a geometry of the probe tool and one or more available orientations of the probe tool within a working envelop for the part when fixtured in the computer-controlled manufacturing system.

17. The non-transitory computer-readable medium of claim 16, wherein the alignment or surface inspection of the part comprises part alignment, and the method comprises:
- finding a vector for each vertex point in the initial set of probing points, the vector for the vertex being normal to a surface of the part at the vertex point; and
- assigning the vertex points to respective axes of manufacturing available in the working coordinate system of the computer-controlled manufacturing system in accordance with a degree of alignment between the vector for each vertex point and each one of the respective axes of manufacturing;
- wherein the filtering comprises ensuring a minimum number of points in each of the respective axes of manufacturing remain in the final set of probing points to lock degrees of freedom for the part alignment.

18. The non-transitory computer-readable medium of claim 17, wherein the assigning comprises ranking the vertex points in the respective axes of manufacturing, and the filtering comprises:
- removing lower ranked points assigned to respective ones of the axes of manufacturing while maintaining coverage of the at least a portion of the three dimensional model of the part; and
- ensuring the minimum number of points in each of the respective axes of manufacturing remain by not removing any higher ranked points forming a minimum set of points previously identified as required to lock the degrees of freedom.

19. The non-transitory computer-readable medium of claim 18, comprising identifying the minimum set of points required to lock the degrees of freedom, the identifying comprising:
- selecting points from the initial set of probing points based on each point's vector alignment with at least one axis of manufacturing to ensure good alignment for each of a first three of the axes of manufacturing;
- selecting at least a fourth axis of manufacturing when the selected points are not sufficient to lock the degrees of freedom;
- adding, to the initial set of probing points, additional points that are reachable by the probe tool using the at least a fourth axis of manufacturing; and
- selecting points from the additional points based on each point's vector alignment with at least one axis of manufacturing to ensure good alignment for each of the first three of the axes of manufacturing and complete the minimum set of points required to lock the degrees of freedom.

20. The non-transitory computer-readable medium of claim 15, wherein the providing comprises directing the computer-controlled manufacturing system to perform the alignment or surface inspection of the part using the final set of probing points.

* * * * *